(12) United States Patent
Fukuyama et al.

(10) Patent No.: US 7,195,402 B2
(45) Date of Patent: Mar. 27, 2007

(54) OPTICAL DEVICE

(75) Inventors: Masashi Fukuyama, Inuyama (JP); Yasunori Iwasaki, Nishikasugai-Gun (JP); Akiyoshi Ide, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 11/156,298

(22) Filed: Jun. 17, 2005

(65) Prior Publication Data

US 2005/0244106 A1  Nov. 3, 2005

Related U.S. Application Data

(63) Continuation-in-part of application No. PCT/JP03/16345, filed on Dec. 19, 2003, which is a continuation-in-part of application No. 10/732,203, filed on Dec. 10, 2003, now abandoned.

(60) Provisional application No. 60/435,105, filed on Dec. 20, 2002.

(30) Foreign Application Priority Data

Dec. 20, 2002 (JP) ............................. 2002-370751
Jan. 27, 2003 (JP) ............................. 2003-017993

(51) Int. Cl.
*G02B 6/36* (2006.01)
*G02B 6/30* (2006.01)

(52) U.S. Cl. ............................. 385/89; 385/88; 385/49

(58) Field of Classification Search .................. None
See application file for complete search history.

(56) References Cited

U.S. PATENT DOCUMENTS

| 4,165,496 | A | 8/1979 | Di Domenico, Jr. et al. |
| 4,756,590 | A | 7/1988 | Forrest et al. |
| 4,989,338 | A | 2/1991 | Tsuji et al. |
| 5,150,438 | A | 9/1992 | Brown |

(Continued)

FOREIGN PATENT DOCUMENTS

EP    0 840 150 A2    5/1998

(Continued)

OTHER PUBLICATIONS

K. Motoki et al., "Connecting Technology of Anisotropic Conductive Materials," Fujikura Giho, No. 99, Oct. 2000, pp. 32-38 (with partial translation of pertinent portion thereof).

(Continued)

*Primary Examiner*—Sung Pak
(74) *Attorney, Agent, or Firm*—Burr & Brown

(57) ABSTRACT

An optical device comprises a PD array and a submount. Anode electrodes and cathode electrodes are disposed as a gold electrode pattern on a surface of the PD array facing the submount and a common cathode electrode and anode electrodes associated with respective channels are disposed as a gold electrode pattern on a mounting surface of the submount. The gold electrode pattern on the PD array and the gold electrode pattern on the submount are electrically connected to each other by a conductive layer. A gap between the PD array and the mounting surface of the submount includes a first gap corresponding to active layers and a second gap around the first gap, the first and second gaps comprising air.

6 Claims, 12 Drawing Sheets

U.S. PATENT DOCUMENTS

| | | | |
|---|---|---|---|
| 5,452,387 | A | 9/1995 | Chun et al. |
| 5,497,438 | A | 3/1996 | Ishikawa et al. |
| 5,499,309 | A | 3/1996 | Kozuka et al. |
| 5,535,296 | A | 7/1996 | Uchida |
| 5,771,322 | A | 6/1998 | Matsumoto et al. |
| 5,793,106 | A | 8/1998 | Yasukawa et al. |
| 5,930,423 | A | 7/1999 | Chen et al. |
| 6,027,253 | A | 2/2000 | Ota et al. |
| 6,075,911 | A | 6/2000 | Goto |
| 6,118,915 | A | 9/2000 | Sato |
| 6,250,820 | B1 | 6/2001 | Melchior et al. |
| 6,282,352 | B1 | 8/2001 | Kato et al. |
| 6,304,708 | B1 | 10/2001 | Fukuyama et al. |
| 6,327,407 | B1 | 12/2001 | Mitsuda et al. |
| 6,344,248 | B1 | 2/2002 | Suga |
| 6,406,196 | B1 | 6/2002 | Uno et al. |
| 6,476,379 | B2 | 11/2002 | Ando et al. |
| 6,626,584 | B2 * | 9/2003 | Fujita et al. ........... 385/88 |
| 6,784,764 | B2 | 8/2004 | Kadota et al. |
| 6,793,410 | B2 * | 9/2004 | Nakanishi et al. ........ 385/92 |
| 6,803,639 | B2 * | 10/2004 | Ono et al. ........... 257/433 |
| 6,819,840 | B2 | 11/2004 | Tohgoh et al. |
| 2003/0044119 | A1 | 3/2003 | Sasaki et al. |
| 2003/0095756 | A1 | 5/2003 | Tohgoh et al. |
| 2004/0042728 | A1 | 3/2004 | Ito et al. |
| 2004/0086231 | A1 | 5/2004 | Fukuyama et al. |

FOREIGN PATENT DOCUMENTS

| | | |
|---|---|---|
| EP | 0 844 503 A1 | 5/1998 |
| EP | 0 908 746 | 4/1999 |
| EP | 0 943 941 A1 | 9/1999 |
| EP | 0 994 171 A2 | 4/2000 |
| EP | 1 063 542 A1 | 12/2000 |
| EP | 1 312 960 A1 | 5/2003 |
| FR | 2 549 243 | 1/1985 |
| JP | 62-056908 | 3/1987 |
| JP | 63-191111 A | 8/1988 |
| JP | 63-205611 | 8/1988 |
| JP | 63-249118 | 10/1988 |
| JP | 64-42610 A | 2/1989 |
| JP | 2-15203 A | 1/1990 |
| JP | 2-96609 | 4/1990 |
| JP | 02-113708 | 4/1990 |
| JP | 3-103804 A | 4/1991 |
| JP | 03-271706 | 12/1991 |
| JP | 04-308804 | 10/1992 |
| JP | 05-203830 A1 | 8/1993 |
| JP | 06-075137 | 3/1994 |
| JP | 6-103821 A1 | 4/1994 |
| JP | 06-331837 | 12/1994 |
| JP | 7-104146 A | 4/1995 |
| JP | 07-104148 | 4/1995 |
| JP | 7-159658 A | 6/1995 |
| JP | 07-234345 | 9/1995 |
| JP | 07-294742 A1 | 11/1995 |
| JP | 8-179128 A1 | 7/1996 |
| JP | 08-179171 | 7/1996 |
| JP | 08213427 A * | 8/1996 |
| JP | 09-021912 A1 | 1/1997 |
| JP | 9-033729 A1 | 2/1997 |
| JP | WO 97/06458 | 2/1997 |
| JP | 09-061664 A1 | 3/1997 |
| JP | 09-101435 | 4/1997 |
| JP | 09-105824 A1 | 4/1997 |
| JP | 9-120014 | 5/1997 |
| JP | 09-186348 A1 | 7/1997 |
| JP | 10-062660 | 3/1998 |
| JP | 10-133054 | 5/1998 |
| JP | 10-186182 | 7/1998 |
| JP | 10-293219 | 11/1998 |
| JP | 10-300936 A1 | 11/1998 |
| JP | 10-307221 A1 | 11/1998 |
| JP | 10-325917 | 12/1998 |
| JP | 11-133255 A1 | 5/1999 |
| JP | 11-142690 | 5/1999 |
| JP | 2000-009953 | 1/2000 |
| JP | 2000-249874 A | 9/2000 |
| JP | 2000-347050 | 12/2000 |
| JP | 2001-10684 | 4/2001 |
| JP | 2001-100063 A1 | 4/2001 |
| JP | 2001-513216 | 8/2001 |
| JP | 2001-264594 A1 | 9/2001 |
| JP | 2002-182051 A | 6/2002 |
| JP | 2002-343983 | 11/2002 |
| JP | 2003-107301 A1 | 4/2003 |
| JP | 2003-156665 A1 | 5/2003 |
| JP | 2003-294992 A1 | 10/2003 |
| WO | 02/31547 | 4/2002 |

OTHER PUBLICATIONS

U.S. Appl. No. 11/156,315, filed Jun. 17, 2005, Fukuyama et al.
U.S. Appl. No. 11/156,324, filed Jun. 17, 2005, Fukuyama et al.
U.S. Appl. No. 11/288,936, filed Nov. 29, 2005, Fukuyama et al.

* cited by examiner

OPTICAL DEVICE

CROSS REFERENCE TO RELATED APPLICATIONS

This application is a continuation-in-part of International Application No. PCT/JP2003/016345, having an international filing date of Dec. 19, 2003,which designated the United States, and is a continuation-in-part of U.S. application Ser. No. 10/732,203,filed Dec. 10, 2003 is now abandoned, which claims the benefit under 35 USC §119(e) of U.S. Provisional Application Ser. No. 601435,105,filed Dec. 20, 2002, the entireties of which are incorporated herein by reference.

BACKGROUND OF THE INVENTION

1. Field of the Invention

The present invention relates to an optical device having an optical fiber array having one or more optical fibers, and more particularly to an optical device suitable for monitoring signal light while it is being propagated through an optical fiber.

2. Description of the Related Art

With the recent development of wavelength multiplex communications using fiber amplifiers, it has become customary to monitor the amounts of light at respective wavelengths with photodiodes (PD), adjust the amounts of light, and then amplify them with amplifiers.

There are known various methods of monitoring the amounts of light at respective wavelengths. Since the optical fibers need to be coupled to respective monitoring devices, the monitoring devices alone result in a considerable size.

Therefore, there has been a demand for smaller and high density monitoring devices. For monitoring signal light, it is customary for the monitoring device to extract a portion of the signal light. It is desirable for monitoring devices to be able to monitor signal light without largely attenuating the signal light.

Heretofore, a technology disclosed in Japanese Laid-Open Patent Publication No. 2001-264594, for example, has been proposed in the art. According to the disclosed technology, an optical fiber is placed in a V-shaped groove defined in a glass substrate, and thereafter a parallel groove is formed in the glass substrate obliquely to (the optical axis of) the optical fiber. Then, a light reflecting base (optical member) is inserted into the parallel groove, with the gap filled with an ultraviolet-curable resin (adhesive).

Of signal light that is propagated through the optical fiber, a light component (reflected light) that is reflected by the light reflecting base is extracted out of the cladding of the optical fiber. The signal light can be monitored by detecting the reflected light with a photodetector, for example.

If PDs are disposed on optical fibers, then since most of the optical fibers used are single-core optical fibers, PDs in metal packages are often employed (see, for example, Japanese Laid-Open Patent Publication No. 10-300936, Japanese Laid-Open Patent Publication No. 11-133255, and the pamphlet of International Publication No. 97/06458). This is because the single-core optical fibers pose less space limitations and many PDs in metal packages are available on the market and have proven satisfactory as to cost and reliability.

However, it is difficult to use PDs in metal packages in combination with multiple-core optical fibers. In particular, if optical fibers are required to be installed at a high density, e.g., at a pitch of 250 μm, then it is necessary to employ a photodiode array (PD array) comprising a plurality of bare photodiodes.

For the purpose of outputting electrode signals from a PD array, the PD array may be mounted on a wiring board (submount), and the submount may be mounted on a multiple-core optical fiber array.

However, of reflected light from a certain channel, light that passes off the active layer of the PD array or passes through the active layer is reflected by the PD array or the mounting surface of the submount (the surface on which the PD array is mounted), and enters as stray light into another channel, tending to cause crosstalk.

Such crosstalk occurs because the PD array and/or the mounting surface of the submount has an electrode pattern made of a material having a high reflectance or a mounting solder layer.

The above problem arises particularly if the reflected light is applied obliquely to the PD array. Specifically, if the reflected light is applied perpendicularly to the PD array, then since the reflected light is applied perpendicularly to the active layer of the PD array, the reflected light recombines with the same channel (desired channel), causing no crosstalk problem. However, if the reflected light is applied obliquely to the PD array, then since the reflected light hits a material having a high reflectance, it becomes stray light which tends to give rise to problems of crosstalk.

SUMMARY OF THE INVENTION

An object of the present invention is to provide an optical device which is capable of effectively reducing crosstalk even if reflected light is applied obliquely.

According to the present invention, there is provided an optical device comprising a first substrate with V-shaped grooves defined therein, one or more optical fibers fixed in the V-shaped grooves in the first substrate, the optical fibers having a reflecting function, an optical element fixed by an adhesive layer to an optical path of reflected light which is generated by at least the reflecting function, outside of claddings of the optical fibers, and a second substrate having a principal surface on which the optical element is mounted, wherein of a gap between the principal surface of the second substrate and the optical element, a gap between at least an active layer of the optical element and the principal surface of the second substrate has no light reflecting member disposed therein.

Of the gap between the principal surface of the second substrate and the optical element, a gap (first gap) between the active layer of the optical element and the principal surface of the second substrate and a gap (second gap) near and around the first gap have no light reflecting member such as of metal disposed therein. This arrangement is effective to suppress reflections at portions of the optical element and the principal surface of the second substrate which correspond to the first gap and the second gap. Even if the reflected light is applied obliquely, i.e., even if the reflected light is applied to the optical element at an angle of 10° or more with respect to the vertical direction, crosstalk can effectively be reduced.

In the above arrangement, the refractive index of the gap between the active layer of the optical element and the principal surface of the second substrate should preferably be lower than the refractive index of a surface of the optical element. The reflected light is spread or scattered due to diffraction when it enters the first gap and the second gap. When the reflected light is spread, the ray density of the reflected light is lowered, and even if the reflected light enters as stray light into other channels, it is not detected as crosstalk because the component thereof is small.

For achieving large diffraction in the first gap and the second gap, they may be filled with a material having a low refractive index. The most preferable material is air. However, though a material having a low refractive index, such as air or the like, allows light that passes therethrough to be spread due to diffraction, a reflected component is generated because of the difference between the refractive indexes of the optical element and the air. This reflected light is considerably smaller than reflected light from a metal material, but may pose a problem in some situations.

It is therefore preferable to equalize the refractive index of the first gap and the second gap to that of the surface of the optical element and allow the first gap and the second gap to spread the light due to scattering. The refractive index of the gaps should preferably be within ±30% of the refractive index of the surface of the optical element.

In this manner, it is possible to suppress reflections at the interface between the optical element and the first and second gaps and also to spread in the reflected light in the first and second gaps, resulting in very small crosstalk.

A means for causing light to be scattered in the first gap and the second gap may be particles interspersed in a material for scattering the reflected light to obtain desired light scattering. If the particles are highly packed to an extent that they are held in contact with each other, then they tend to increase reflections. Therefore, the particles should preferably be interspersed macroscopically though they may be held partly in contact with each other.

The material may be an anisotropic conductive material. Inasmuch as the anisotropic conductive material contains therein interspersed spherical polymer particles having a diameter of about 3 µm coated with a conductive material such as gold or the like, it is a suitable material for scattering the light in the first gap and the second gap.

Furthermore, of the gap between the principal surface of the second substrate and the optical element, a portion except the first gap and the second gap, i.e., a portion which does not affect the optical path of the reflected light, may have an electrode layer interposed therein. With such an arrangement, when the anisotropic conductive material is thermally compressed, electrodes, where an electrode pattern of Au or the like is raised, are brought into electric conduction with each other by the spherical polymer particles coated with the conductive material. However, in regions remote from the electrode layer, the spherical polymer particles are not held in contact with each other, and are interspersed at a low density. That is, the electrode layer disposed around the first gap and the second gap makes it possible to achieve a more preferable state.

As a consequence, the anisotropic conductive material can achieve both electric conduction between the optical element and the submount and scattering of the reflected light.

As described above, it is an object to cause light to be spread in the first gap and the second gap by either diffraction or scattering. Such an effect can be achieved if the length of the first gap and the second gap is large. The length should preferably be 20 µm or greater.

The length may be obtained by providing a spacer or the like. The electrode layer disposed as described above is preferable because it also serves as a spacer.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Several embodiments in which an optical device according to the present invention is applied to an in-line power monitoring module, for example, will be described below with reference to FIGS. 1 through 12.

Figure 1:
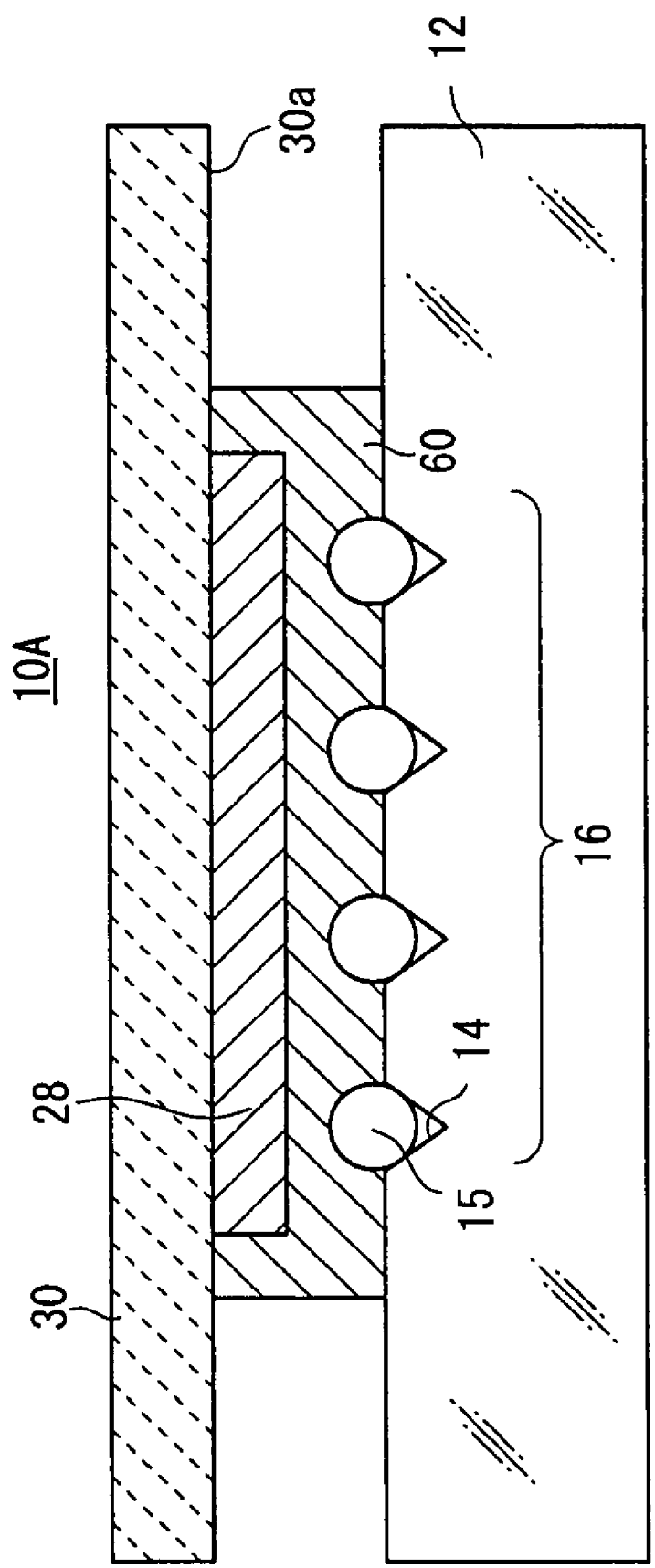
FIG. 1 is a cross-sectional view of an optical device according to a first embodiment of the present invention, the view being taken along a plane normal to the optical axes of optical fibers.
Figure 2:
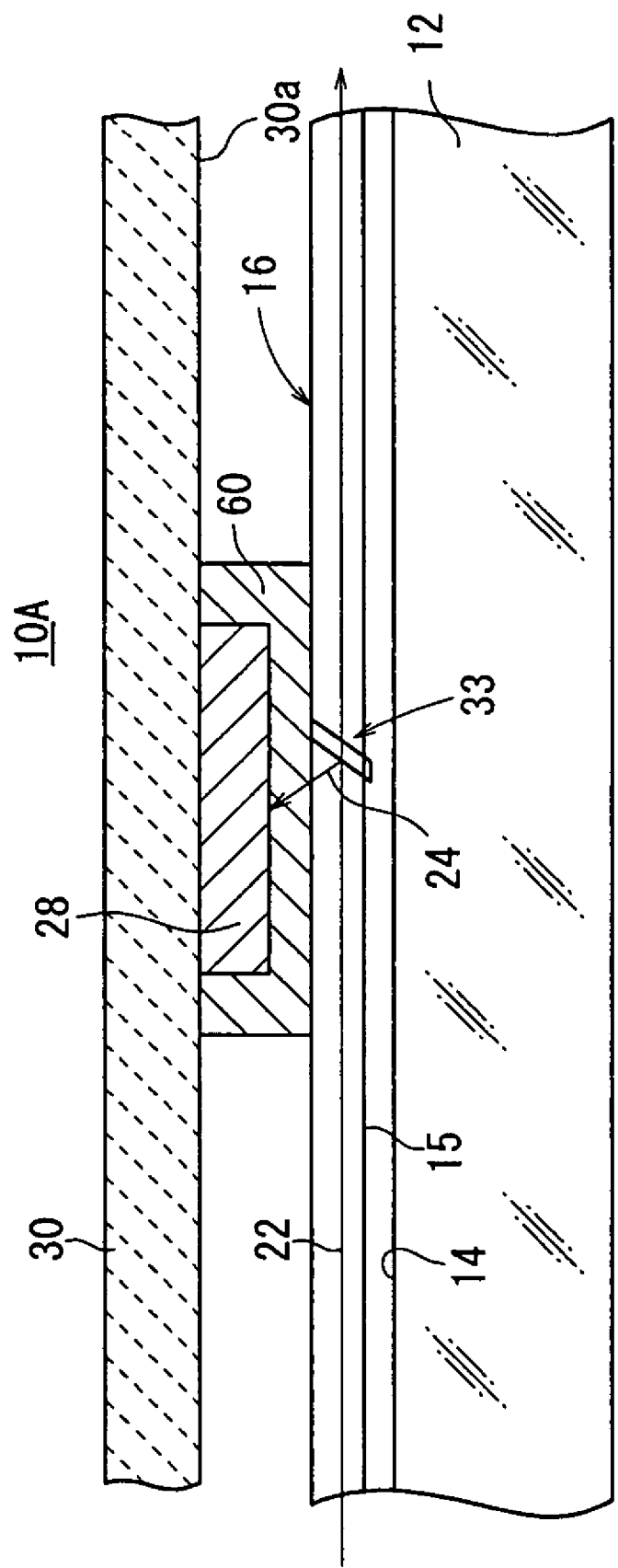
FIG. 2 is a cross-sectional view of the optical device according to the first embodiment, the view being taken along the optical axis of an optical fiber.

As shown in FIG. 1, an optical device 10A according to a first embodiment of the present invention has a glass substrate 12, an optical fiber array 16 comprising a plurality of optical fibers 15 fixed in a plurality of V-shaped grooves 14 defined in the glass substrate 12, a PD (PhotoDiode) array 28 fixed by an adhesive layer 60 to an optical path of light (reflected light) 24 which is generated by at least a reflector, of signal light 22 passing through the optical fibers 15, for thereby detecting the reflected light 24, and a wiring board (submount) 30 on which the PD array 28 is mounted. The submount 30 has a mounting surface 30a for the PD array 28, disposed in confronting relation to the glass substrate 12.

In this embodiment, the optical fiber array 16 comprises a plurality of optical fibers 15, and "each of the optical fibers 15" means "each of the four optical fibers 15". However, since even one optical fiber 15 can make up the optical fiber array 16, "each of the optical fibers" or "a plurality of optical fibers" may read as "a single optical fiber".

Figure 3:
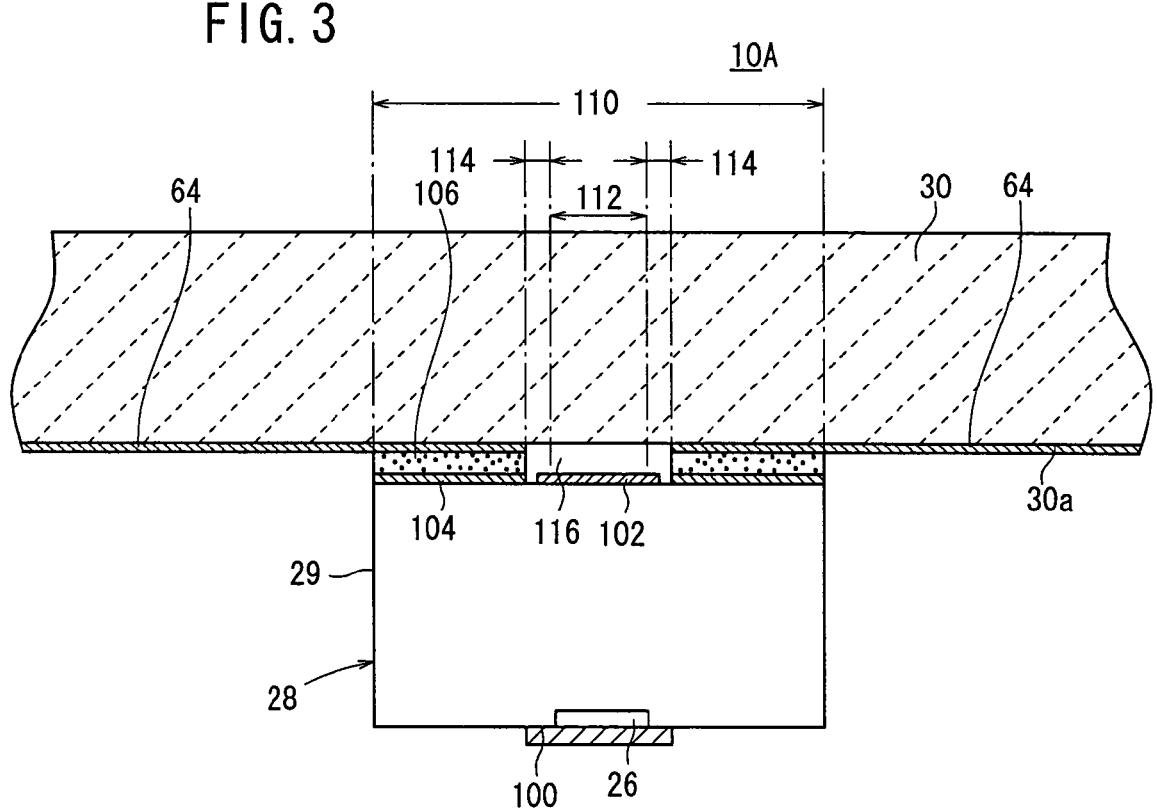
FIG. 3 is a cross-sectional view of the optical device according to the first embodiment, the view showing the manner in which a PD array is mounted on a submount.

As shown in FIG. 3, the PD array 28 is of a structure for detecting light applied to its face side. The PD array 28 has a substrate 29 and as many active layers 26 as the number of channels on the substrate 29. The active layers 26 are disposed on a portion of the substrate 29 which is close to and confronts the optical fiber array 16 (see FIG. 1). Anti-reflection films (AR coats) 100, 102 are disposed on portions of an upper surface of the PD array (a surface facing the submount 30) and a lower upper surface of the PD array (a surface facing the optical fiber array 16), which portions correspond to the active layers 26.

Anode electrodes and cathode electrodes are disposed as a gold electrode pattern 104 on the surface of the PD array 28 which faces the submount 30, and a common cathode electrode and anode electrodes associated with the respective channels are disposed as a gold electrode pattern 64 on the mounting surface 30a of the submount 30.

The gold electrode pattern 104 on the PD array 28 and the gold electrode pattern 64 on the submount 30 are electrically connected to each other by a conductive layer 106 such as a solder layer, an ACP (anisotropic conductive paste), an ACF (anisotropic conductive film), or the like. The PD array 28 described above is of the cathode-common type, but may be of the anode-common type for the same advantages.

In the optical device 10A according to the first embodiment, a gap 110 between the PD array 28 and the mounting surface 30a of the submount 30 includes a gap (first gap) 112 corresponding to the active layers 26 and a gap (second gap) 114 around the gap 112, the gaps 112, 114 comprising air 116.

Of the reflected light from a certain channel, light that passes off the active layers 26 of the PD array 28 or passes through the active layers 26 passes through an interface between the air 116 of the first and second gaps 112, 114 and the substrate 29 of the PD array 28, an interface between the air 116 of the first and second gaps 112, 114 and the anti-reflection film 102, and the air 116 of the first and second gaps 112, 114, and reaches the mounting surface 30a of the submount 30.

Since the mounting surface 30a of the submount 30 does not have a high reflectance such as that of the gold electrode pattern 64, the mounting surface 30a can suppress reflections from the portions of the PD array 28 and the mounting surface 30a of the submount 30 which correspond to the first and second gaps 112, 114. Therefore, even if the reflected light 24 is applied obliquely, i.e., even if the angle at which the reflected light 24 is applied to the PD array 28 is 10° or greater with respect to the vertical direction, crosstalk is effectively reduced.

If the substrate 29 of the PD array 28 is made of InP, then the substrate 29 has a refractive index of about 3.2. If the anti-reflection film 102 is grown as an SiN film on the surface of the substrate 29, then the anti-reflection film 102 has a refractive index of about 1.9.

The reflected light 24 passes through the substrate 29 of the PD array 28 and the anti-reflection film 102. The reflected light 24 should preferably be spread due to diffraction or scattering in the first and second gaps 112, 114. This is because if the reflected light 24 is spread, its ray density is lowered and its component is small even if applied as stray light to other channels.

For achieving large diffraction in the first and second gaps 112, 114, they may be filled with a material having a low refractive index. According to the present embodiment, since the first and second gaps 112, 114 are filled with the air 116 whose refractive index is lower than the refractive indexes of the substrate 29 of the PD array 28 and the anti-reflection film 102, the first and second gaps 112, 114 can produce large diffraction.

The submount 30 should preferably be made of a polycrystalline ceramic material. If the submount 30 is made of metal, then it has a high refractive index, but the scattering of the reflected light is small, tending to cause the reflected light to become stray light. If the submount 30 is a polycrystalline ceramic material, then even though the mounting surface 30a of the submount 30 has surface like a mirror due to the gold electrode pattern 64, the submount 30 causes light to be scattered due to crystalline grain boundary. Consequently, the amount of reflected light applied as stray light to other channels is reduced, and the problem of crosstalk is also reduced.

The material having a low refractive index, such as the air 116 or the like, allows the reflected light 24 to be spread due to diffraction. However, a reflected light component is produced due to the refractive index difference. This reflected light component is considerably smaller than the reflected light from the metal, but may pose a problem in some cases.

Accordingly, it is preferable to make the refractive index of the first and second gaps 112, 114 close to the refractive index of the substrate 29 of the PD array 28 and also to cause the first and second gaps 112, 114 to spread light due to scattering. The refractive index of the first and second gaps 112, 114 should preferably be within ±30% of the refractive index of the substrate 29 of the PD array 28. According to the first embodiment, a preferable refractive index difference is achieved because the anti-reflection film 102 of SiN or the like is disposed on the surface of the PD array 28 (which faces the submount 30).

Therefore, reflections at the interface between the PD array 28 and the first and second gaps 112, 114 can be reduced, and the reflected light 24 is spread by the first and second gaps 112, 114, with the result that crosstalk is very small.

An optical device 10B according to a second embodiment will be described below with reference to FIG. 4.

Figure 4:
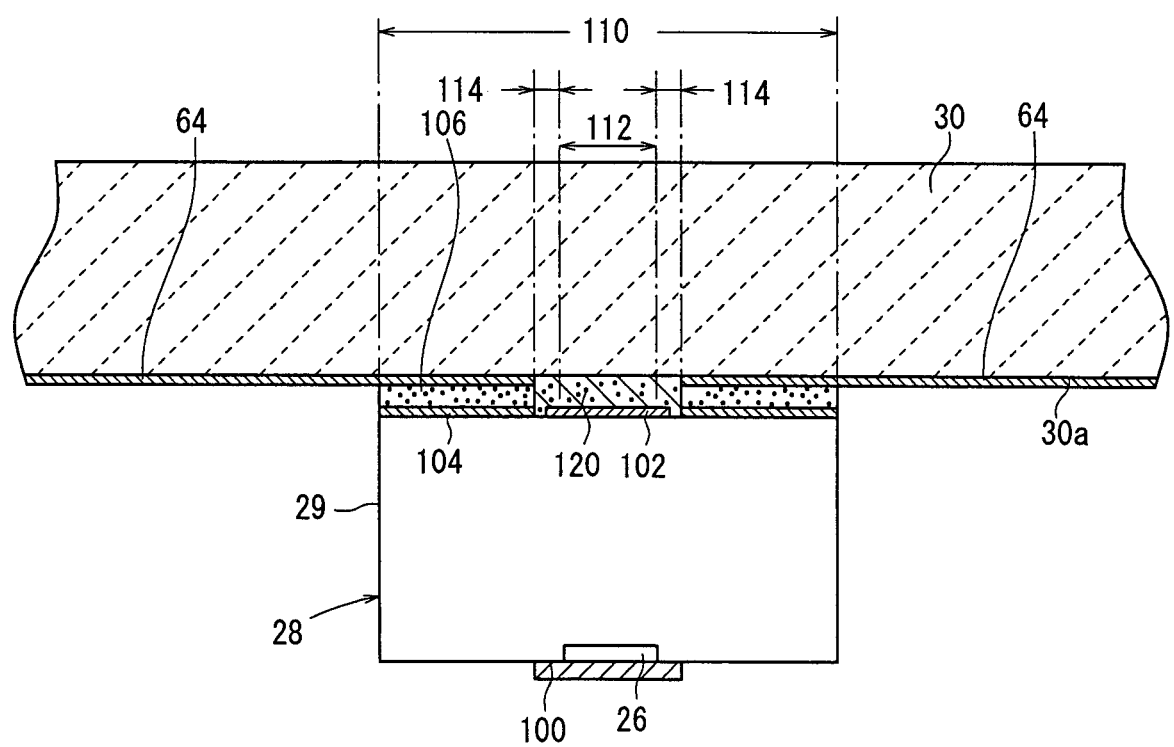
FIG. 4 is a cross-sectional view of an optical device according to a second embodiment, the view showing the manner in which a PD array is mounted on a submount.

The optical device 10B according to the second embodiment is of substantially the same structure as the optical device 10A according to the first embodiment, but differs therefrom in that, as shown in FIG. 4, the first and second gaps 112, 114 are filled with an anisotropic conductive material 120 such as an ACP (anisotropic conductive paste), an ACF (anisotropic conductive film), or the like.

The anisotropic conductive material 120 contains therein interspersed spherical polymer particles coated with a conductive material such as gold or the like. The spherical polymer particles scatter the reflected light 24 to achieve desired scattering thereof. If the spherical polymer particles are so highly packed that they are held in contact with each other, then they tend to reflect the light largely. Therefore, even though the spherical polymer particles are partly held in contact with each other, they should preferably be interspersed macroscopically.

As with the optical device 10A according to the first embodiment, the optical device 10B according to the second embodiment is capable of reducing reflections from the interface between the PD array 28 and the first and second gaps 112, 114, and spreading the reflected light 24 at the first and second gaps 112, 114, with the result that crosstalk is very small.

An optical device 10C according to a third embodiment will be described below with reference to FIG. 5. Those parts of the optical device 10C which correspond to those of the optical device 10B shown in FIG. 4 are denoted by identical reference characters and will not be described below.

Figure 5:
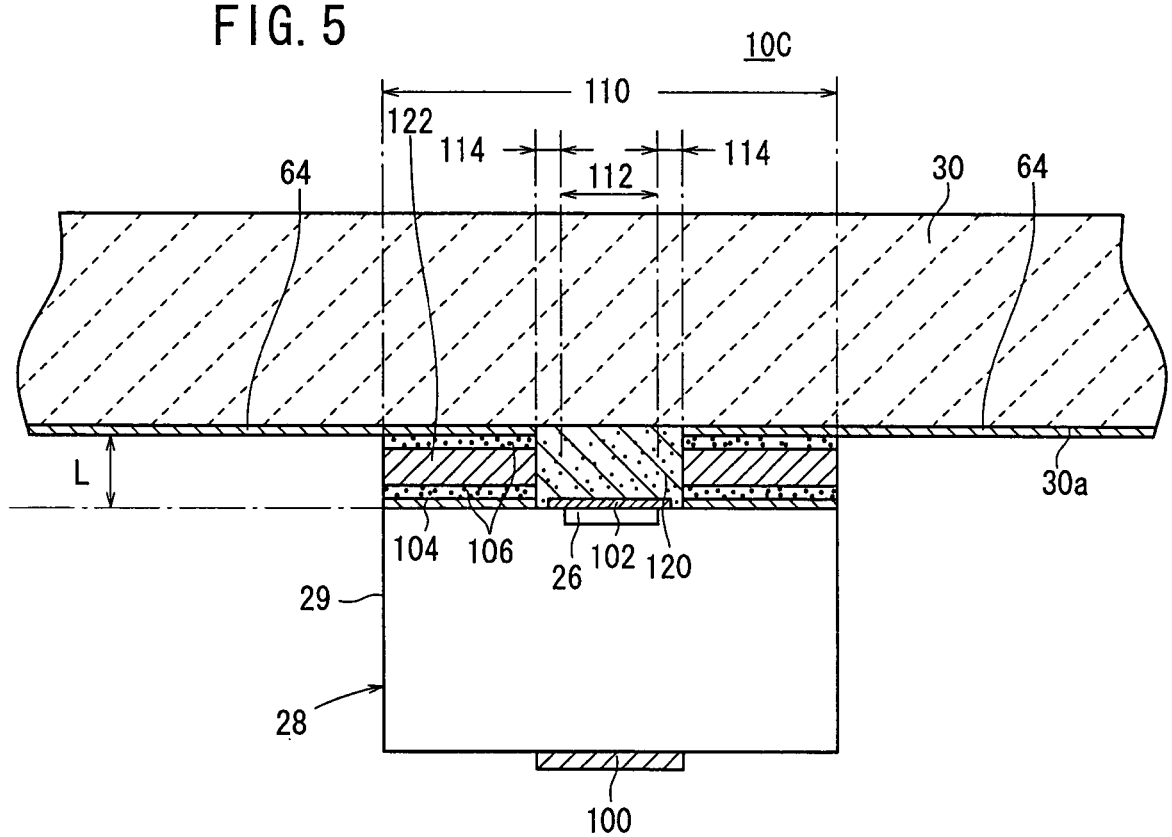
FIG. 5 is a cross-sectional view of an optical device according to a third embodiment, the view showing the manner in which a PD array is mounted on a submount.

The optical device 10C according to the third embodiment differs from the optical device 10B shown in FIG. 4 in that, as shown in FIG. 5, the PD array 28 is of a structure for detecting light applied to its reverse side.

The PD array 28 has a substrate 29 and as many active layers 26 as the number of channels on the substrate 29. The active layers 26 are disposed on a portion of the substrate 29 which is close to the submount 30 and the mounting surface 30a of the submount 30.

In the optical device 10C, a gold electrode pattern 104 on the PD array 28 and a gold electrode pattern 64 on the submount 30 are electrically connected to each other by a conductive layer 106 such as an ACP (anisotropic conductive paste), an ACF (anisotropic conductive film), or the like, and bumps 122 of gold.

With the optical device 10C according to the third embodiment, as with the optical device 10B according to the second embodiment, the first and second gaps 112, 114 are filled with an anisotropic conductive material 120 such as an ACP (anisotropic conductive paste), an ACF (anisotropic conductive film), or the like.

As with the optical device 10B according to the second embodiment, the optical device 10C according to the third embodiment is capable of reducing reflections from the interface between the PD array 28 and the first and second gaps 112, 114, and spreading the reflected light 24 at the first and second gaps 112, 114, with the result that crosstalk is very small.

Furthermore, in the optical device 10C, the bumps 122 of gold are interposed in portions of the gap 110 between the mounting surface 30a of the submount 30 and the PD array 28 except for the first and second gaps 112, 114, i.e., portions not affecting the optical path of the reflected light 24. Accordingly, the spherical polymer particles in the anisotropic conductive material 120 that fills the first and second gaps 112, 114 are attracted to the bumps 122 of gold.

Therefore, in regions of the anisotropic conductive material 120 around the bumps 122 of gold, the spherical polymer particles are so highly packed that they are held in contact with each other. In regions of the anisotropic conductive material 120 remote from the bumps 122 of gold, such as the first gaps 112, the spherical polymer particles are scarcely packed that they are interspersed appropriately. This state is suitable for scattering the reflected light 24, allowing the first and second gaps 112, 114 to further spread the reflected light 24.

As a result, the anisotropic conductive material 120 is capable of achieving both electric conduction between the PD array 28 and the submount 30 and scattering of the reflected light 24.

As described above, the optical device 10C serves the purpose of spreading the reflected light 24 at the first and second gaps 112, 114 through either diffraction or scattering. Such an effect can be enhanced if the length L of the first and second gaps 112, 114 is longer. The length L should preferably be 20 μm or greater.

The length L may be obtained by providing a spacer or the like. Since the bumps 122 of gold disposed between the submount 30 and the PD array 28 serve as a spacer, the length L of the first and second gaps 112, 114 can easily be adjusted by the bumps 122 of gold.

An inventive example of the optical device 10C according to the third embodiment will be described below with reference to FIGS. 6 through 12.

Figure 6:
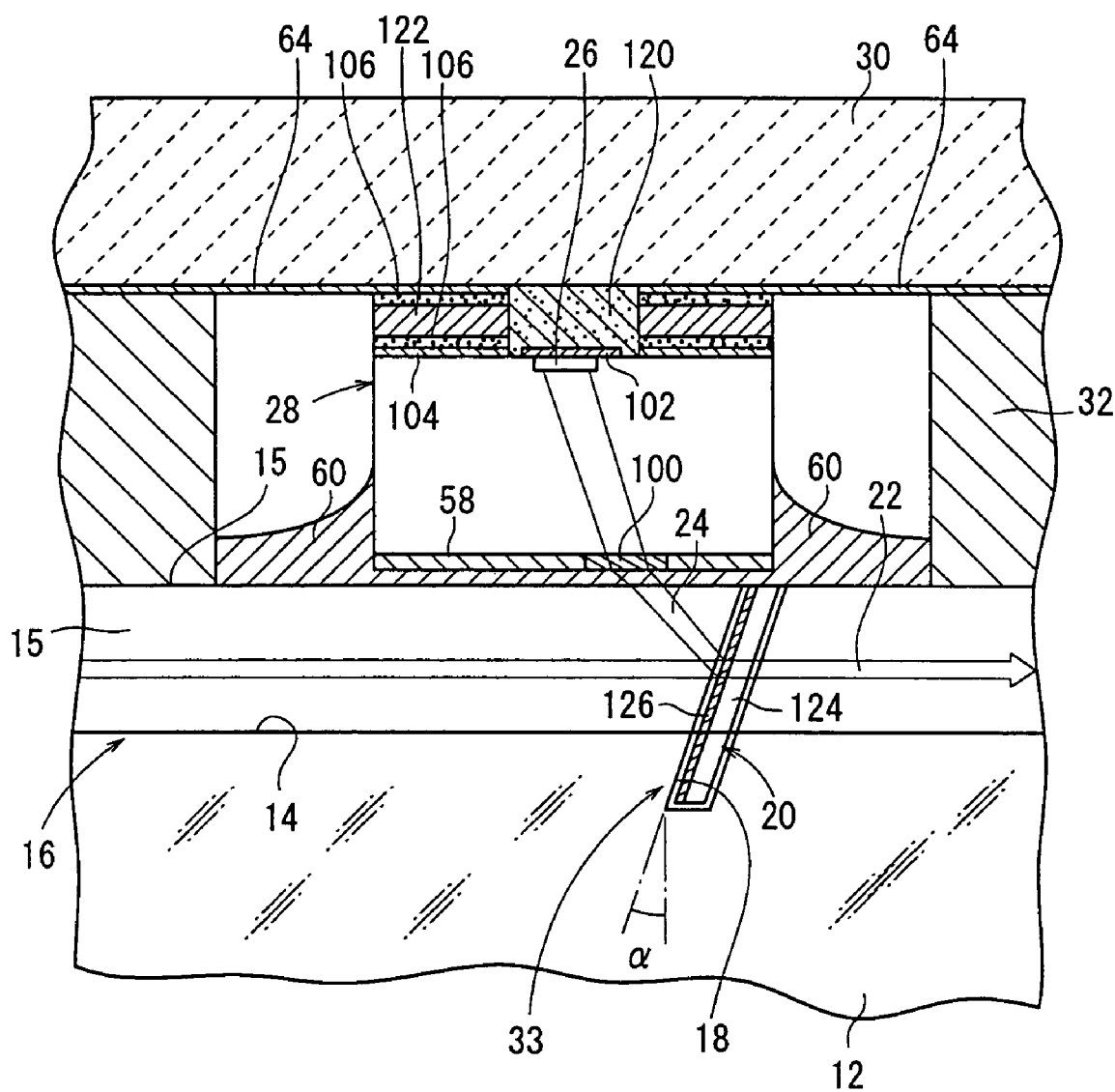
FIG. 6 is a cross-sectional view of a central portion of an optical device according to an inventive example.

As shown in FIG. 6, an optical device 10Ca according to the inventive example has a glass substrate 12, an optical fiber array 16 comprising a plurality of optical fibers 15 fixed in a plurality of V-shaped grooves 14 defined in the glass substrate 12, a slit 18 extending from respective upper surfaces of the optical fibers 15 into the glass substrate 12, a dividing member 20 inserted in the slit 18, a PD array 28 having a plurality of active layers 26 for detecting reflected light 24 produced by at least a reflector 33, of signal light 22 passing through the optical fibers 15, a submount 30 fixing the PD array 28 so as to face the optical fiber array 16, and a spacer 32 for stably fixing at least the PD array 28. Two end faces of the slit 18 and face and reverse sides of the dividing member 20 function as the reflector 33 for reflecting part of light 22 that passes through the optical fibers 15.

A process of fabricating the optical device 10Ca according to the inventive example will be described below. A glass substrate 12 for use in an in-line optical fiber array 16 was fabricated by a grinding process.

The glass substrate 12 was made of borosilicate glass (particularly, Pyrex (registered trademark) glass material was used). The glass substrate 12 had a size represented by a length of 16 mm and a thickness of 1 mm. 12 V-shaped grooves 14 for aligning the optical fiber array 16 were formed at a pitch of 250 μm to a depth of about 90 μm by a grinding process.

Then, the optical fiber array 16 was assembled. The optical fiber array 16 comprised a 12-core ribbon fiber assembly 46 having a pitch of 250 μm (see FIG. 9). The tape was peeled off from the 12-core ribbon fiber assembly 46 to provide a peeled region having a length of 12 mm, and the optical fibers were placed in the V-shaped groove 14 in the glass substrate 12 and fixed in place by an ultraviolet-curable resin adhesive 52 (see FIG. 9).

Then, the slit 18 was formed in and across the optical fiber array 16. The slit 18 had a thickness of 30 μm, a depth of 200 μm, and a tilt angle α of 20° (see FIG. 6).

Then, the dividing member 20 was fabricated. A substrate 124 of the dividing member 20 was made of quartz glass. A dividing multilayer film 126 was formed on the quartz glass substrate 124. The dividing multilayer film 126 had a designed tilt angle of 20°, a division ratio represented by a transmittance of 93% and a reflectance of 7%. The multilayer film 126 was formed of $SiO_2$, $TiO_2$, $Al_2O_3$, for example, on the quartz glass substrate 124 by evaporation. The quartz glass substrate 124 with the multilayer film 126 formed thereon was machined into a chip having a size of 6 mm×2 mm. The substrate 124 in the form of the chip was polished into a thin plate having a thickness of 25 μm.

Thereafter, the dividing member 20 was inserted into the slit 18, and coated with an ultraviolet-curable adhesive, which was cured by an ultraviolet radiation applied thereto to install the dividing member 20 in place.

The PD array 28 was designed as follows: The PD array 28 had 12 channels, and had a height of 150 μm, a width of 420 μm, and a length of 3 mm.

The PD array 28 had a structure for detecting light applied to its reverse side, as with the optical device 10C according to the third embodiment. The area above the active layer 26 (which faces the submount 30) was filled with an anisotropic conductive material 120.

The PD array 28 has the structure for detecting light applied to its reverse side for the following reasons: If the PD array 28 having the structure for detecting light applied to its face side as shown in FIG. 3 is employed, then even though it can suppress reflections at the reverse side, reflected light 24 may slightly reach the face side and recombine with the active layers 26 in other channels. If the PD array 28 having the structure for detecting light applied to its reverse side, then since part of the reflected light at the face side is absorbed by the active layers 26 in nearby channels, the reflected light is considerably reduced thereby.

Figure 7:
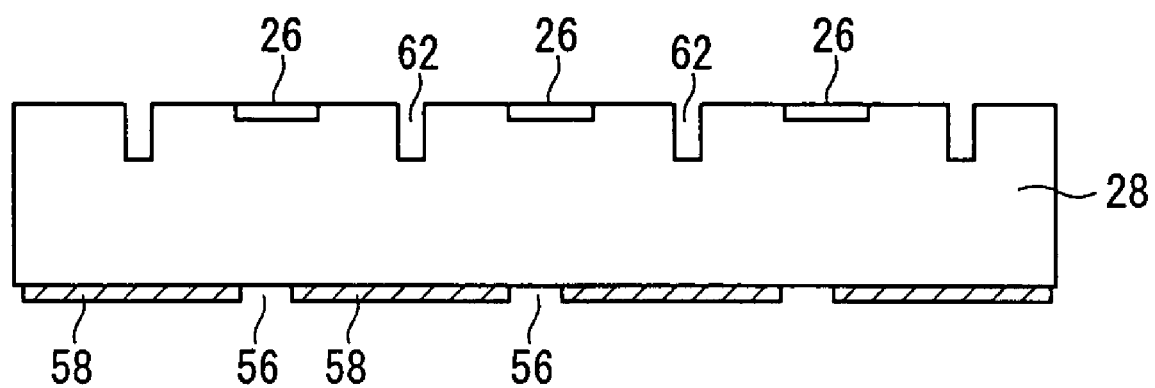
FIG. 7 is a view showing a PD array for detecting light applied to its reverse side, which is used in the optical device according to the inventive example.

As shown in FIG. 7, the entrance side (face side) of the PD array 28 having the structure for detecting light applied to its reverse side employs a metal mask structure with a metal film 58 having a plurality of entrance windows 56 each having a diameter of 70 μm. The diameter of the entrance windows 56 should preferably be in the range from 40 to 80 μm. Since a crosstalk level of −30 dB is problematic, the entry of slight light into other channels poses a problem. The reflected light 24 as seen from this point of view is diffracted and scattered as it passes through the adhesive in the slit 18, the end faces of the slit 18, the cores of the optical fibers 15, the claddings of the optical fibers 15, and the adhesive layer 60 to which the PD array 28 is fixed, and then reaches the PD array 28. Furthermore, slight reflections caused by the two end faces of the slit 18 and the reverse side of the dividing member 20 are combined with the reflected light 24 and the reach the PD array 28. With these slight reflections added, the light applied to the PD array 28 is spread to a diameter ranging from 80 to 100 μm. When the light thus spread is applied to the PD array 28, part of the light strays out of the active layers 26, producing stray light. Therefore, crosstalk characteristics can be improved by limiting the aperture on the entrance side of the PD array 28. If the diameter of the entrance windows 56 is less than 40 μm, then since the aperture is too restricted, the efficiency with which the PD array 28 detects light (the efficiency with which the active layers 26 detect light) is lowered. If the diameter of the entrance windows 56 is greater than 80 μm, then the crosstalk characteristics are impaired.

Inasmuch as the reflected light 24 from the reflector 33 is applied to the PD array 28 at a certain angle (an angle equal to or greater than 10° with respect to the vertical direction), the entrance windows 56 are provided at such positions that the reflected light 24 is optimally applied to the active layers 26.

The photodetector portion (active layers 26) of the PD array 28 having the structure for detecting light applied to its reverse side has a diameter of about 60 μm. The diameter of the photodetector portion (active layers 26) should preferably be in the range from 40 to 80 μm. If the diameter of the photodetector portion (active layers 26) is smaller than 40 μm, then since the size of the photodetector portion (active layers 26) is too small, the efficiency with which the PD array 28 detects light tends to be lowered. If the diameter of the photodetector portion (active layers 26) is greater than 80 μm, then since it is likely to pick up stray light, the crosstalk characteristics tend to be impaired.

As shown in FIG. 7, physical grooves 62 are formed in blocks between the channels of the PD array 28 having the structure for detecting light applied to its reverse side, thereby separating the channels from each other. Usually, p-type areas may be formed in the blocks between channels of an n-type substrate, thereby providing barriers between the channels. According to the present inventive example, however, the channels are more reliably separated by forming the physical grooves 62 having a depth greater than the thickness of the active layers 26 having a depth ranging from 2 to 20 μm, around the photodetector areas.

The submount 30 is mounted in a structure in which the optical fiber 15, the PD array 28, and the submount 30 are arranged successively. If the submount 30 is mounted in a structure in which the optical fiber 15, the submount 30, and the PD array 28 are arranged successively, then since the submount 30 is present between the optical fiber 15 and the PD array 28, the length of the optical path of the reflected light 24 is increased, and the reflected light 24 is spread greatly, posing disadvantages with respect to the efficiency with which the PD array 28 detects light and crosstalk.

With the structure in which the optical fiber 15, the PD array 28, and the submount 30 are arranged successively, if the PD array 28 is of the structure for detecting light applied to its face side, then wire bonding is required to provide electric conduction from the face side to the submount 30. A space of about 100 μm is needed for wire bonding. This space needs to be filled with the adhesive layer 60 for the purposes of refractive index matching with the optical fibers 15 (quartz) and reliability. Specifically, if the PD array 28 is of the structure for detecting light applied to its face side, the adhesive layer 60 of 100 μm is present in the optical path, and makes characteristics such as PDL and wavelength dependency unstable. Because bonding wires are usually made of metal such as gold, when light is applied to those bonding wires, the light is reflected thereby as stray light, impairing crosstalk.

If the PD array 28 is of the structure for detecting light applied to its reverse side, then the PD array 28 can theoretically be held in contact with the optical fibers 15. However, if the PD array 28 and the optical fibers 15 are held in contact with each other, then physical defects may be liable to occur. Consequently, a space of about 10 μm may be provided therebetween for safety, and filled with the adhesive layer 60.

The lengths of the optical paths of the above structures will be compared with each other. If it is assumed that the active layers 26 are present on the surface of the substrate of the PD array 28 (the surface confronting the optical fibers 15), then since the distance between the surfaces of the optical fibers 15 and the active layers 26 is 100 μm with the structure for detecting light applied to its face side, the length of the optical path is 100/1.45≈69 μm provided that the refractive index of the adhesive layer 60 is 1.45 as with quartz. With the structure for detecting light applied to its reverse side, if the thickness of the adhesive layer 60 is 10 μm and the thickness of the general PD array 28 is 150 μm, then the length of the optical path is 10/1.45+150/3.5≈50 μm. Optically, the length of the optical path is shorter with the structure for detecting light applied to its reverse side, and hence the structure for detecting light applied to its reverse side is preferable from this point of view.

The structure for detecting light applied to its face side and the structure for detecting light applied to its reverse side are largely different from each other with respect to the angle at which the light is applied to the active layers 26. With the structure for detecting light applied to its face side, even if the faces side has a coating of silicon nitride (having a refractive index of 1.94), the angle at which the light is applied to the PD array 28 is about 35° if the tilt angle α of the slit 18 is 20°. With the structure for detecting light applied to its reverse side, the angle at which the light is applied to the PD array 28 is 18.5°, which is much smaller than with the structure for detecting light applied to its face side. The structure for detecting light applied to its reverse side is preferable from the standpoint of the efficiency with which the PD array 28 detects light.

Figure 8:
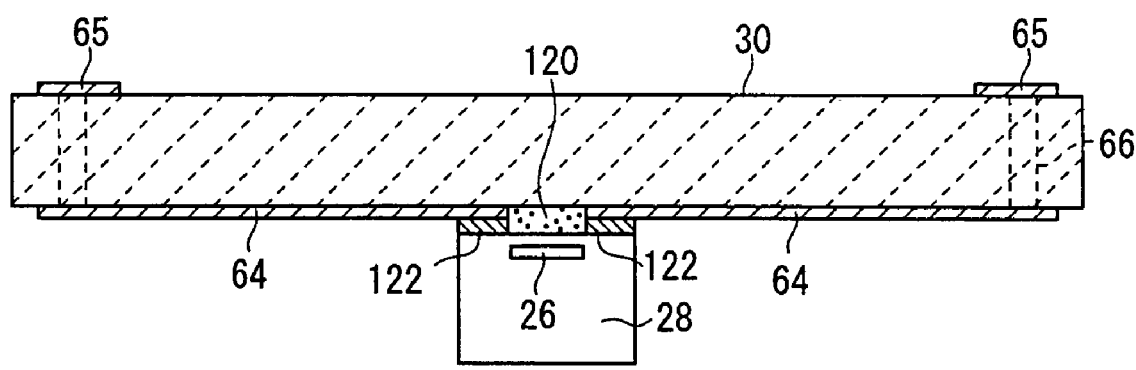
FIG. 8 is a cross-sectional view showing a PD array mounted on the lower surface of a submount.
Figure 9:
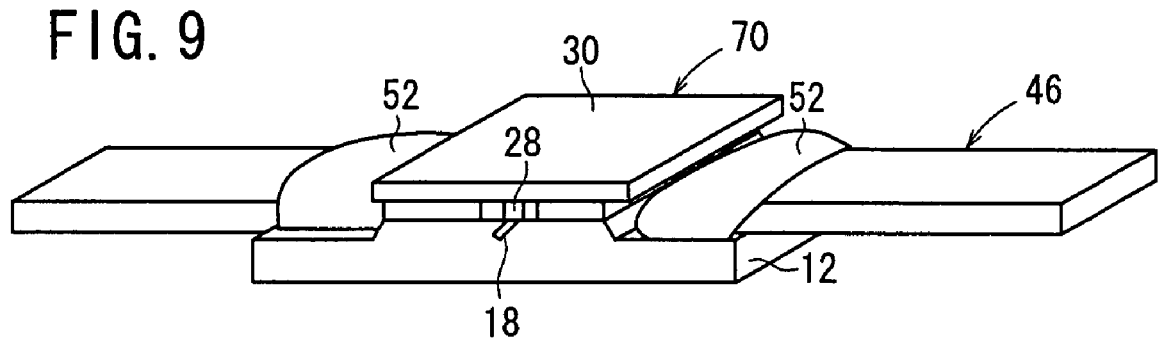
FIG. 9 is a perspective view of an optical head wherein the submount with the PD array mounted thereon is mounted on an optical fiber array.

Then, the PD array 28 was mounted on the submount 30. As described later (see FIG. 10), the side on the optical fiber array 16 was placed on a package 72, and in order to bring pins 74 of the package 72 and electrode pads of the submount 30 into electric conduction with bonding wires 76, a gold electrode pattern 64 was formed on the lower surface of the submount 30, as shown in FIG. 8. The PD array 28 was mounted in such a manner that the PD array 28 was disposed on the lower surface of the submount 30, and the electrode pattern 64 was extended to the upper surface of the submount 30 via through holes 66. Thus, electrode pads 65 depending on the electrode pattern 64 were formed on the upper surface of the submount 30. The submount 30 was made of $Al_2O_3$.

The anisotropic conductive material 120 was thermally compressed such that the spherical polymer particles in the anisotropic conductive material 120, each having a diameter of about 3 μm and coated with a conductive material such as gold or the like, are sandwiched between the bumps 122 of gold as they are raised and the electrode pattern 64, bringing the electrode pattern 64 and the bumps 122 of gold into electric conduction with each other. The spherical polymer particles in the anisotropic conductive material 120 also remain below the entrance windows 56 (see FIG. 7) formed in the PD array 28. As the spherical polymer particles are coated with a conductive material and scatter light emitted from the windows 56, the spherical polymer particles are expected to serve to prevent the light from returning into the PD array 28.

The portions of the lower surface of the submount 30 which correspond to the active layers 26 are coated with an anti-reflection film (SiN) 100 for the purpose of suppressing reflections due to the refractive index difference.

Then, the PD array 28 was centrally aligned. Specifically, as shown in FIG. 6, the spacer 32 for determining the gap between the optical fiber array 16 and the PD array 28 was installed on the submount 30.

The spacer 32 was made of borosilicate glass, particularly Pyrex (registered trademark) glass material. The gap length was set to 10 μm. Since the thickness of the PD array 28 including the bumps 122 of gold was 190 μm, the spacer 32 had a thickness of 200 μm.

Then, the upper portions of the optical fibers 15 serving as the optical path of the reflected light 24 were coated with a required mount of adhesive layer 60. The PD array 28 was aligned by active alignment to maximize the power of the reflected light 24 detected by the PD array 28 (the power of the reflected light 24 detected by the active layer 26 corresponding to the channels at the opposite ends of the optical fiber array 16) when light is applied to the channels at the opposite ends of the optical fiber array 16. The power of the reflected light 24 detected by the PD array 28 was monitored by observing an output current from the active layer 26 corresponding to the channels at the opposite ends of the optical fiber array 16, with a probe applied to the submount 30. Thereafter, the PD array 28 was secured to the optical fiber array 16 by ultraviolet radiation. At this state, an optical head 70 shown in FIG. 9 was completed.

Figure 10:
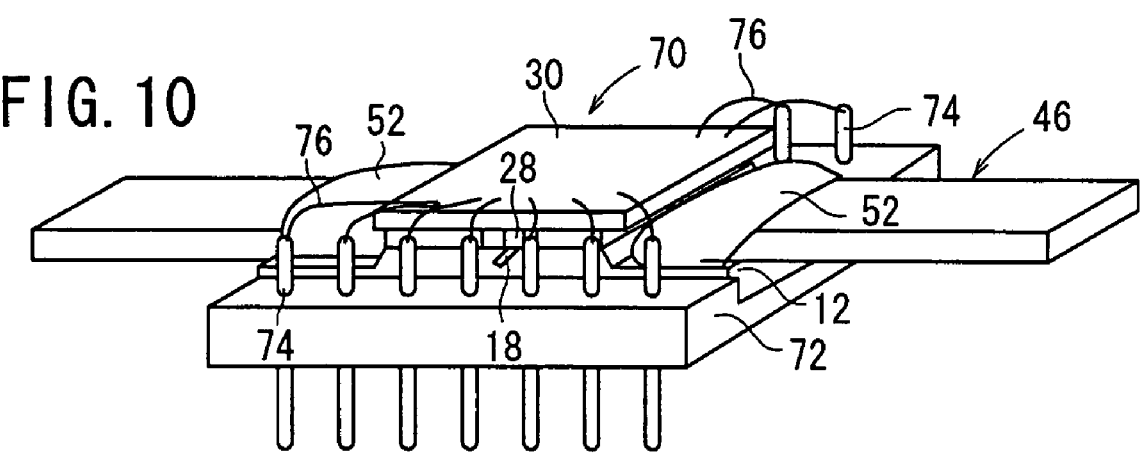
FIG. 10 is a perspective view of the optical head wherein electrode pads of the submount and pins of a packet are connected by wire bonding.

Then, as shown in FIG. 10, a die bonding process was performed to secure the optical head 70 to a central portion of the package 72.

The package 72 used was in the form of a 14-pin metal package. The package 72 had dimensions including a length of 20 mm and a width of 12.5 mm. The optical head 70 was fixed to the package 72 by a thermosetting adhesive.

Then, wire bonding was performed between a plurality of pins 74 fixed to the opposite sides of the package 72 and electrode pads 65 (see FIG. 8) of the submount 30. The wires 76 were Al—Si wires each having a diameter of 20 μm. The first sides of the wires were at the pins 74 of the package 72, and the second sides thereof at the electrode pads 65 of the submount 30.

Figure 11:
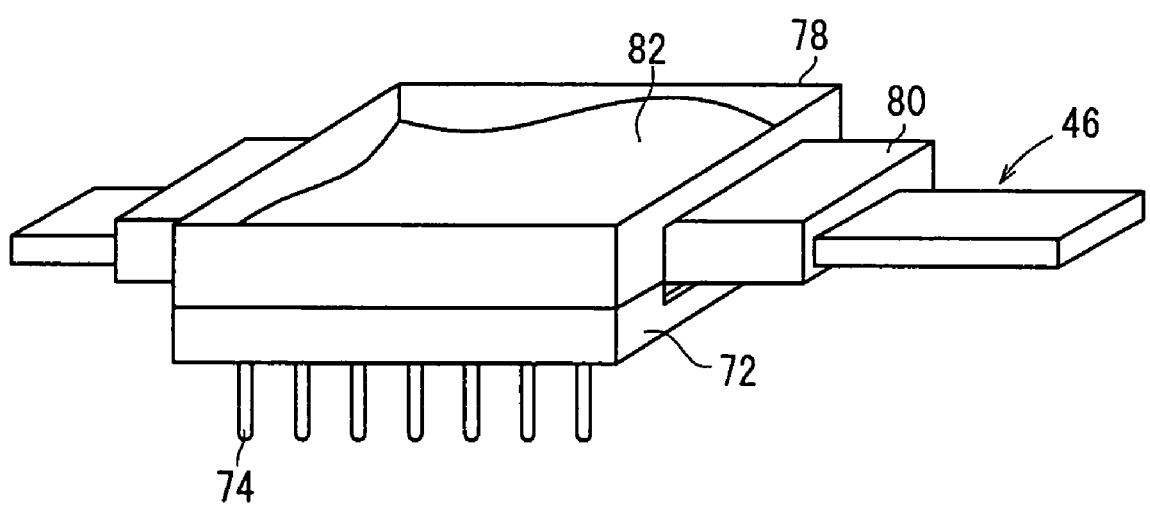
FIG. 11 is a perspective view of the optical head to which a ring and boots are fixed and which is sealed by a resin.

Then, as shown in FIG. 11, a ring 78 was fixed in surrounding relation to the optical head 70, and boots 80 were fixed to the portions of the optical head 70 from which the optical fiber array 16 extends. The optical head 70 was sealed by a resin 82.

The ring 78 serves as a dam when the optical head 70 was sealed by the resin 82. The ring 78 was made of a stainless steel material. The ring 78 may be made of a resin mold for cost reduction. The ring 78 had a height of about 4 mm. The ring 78 was fixed in place by a thermosetting adhesive. The boots 80 comprised general-purpose boots of rubber fixed to the ring 78.

The sealing resin 82 comprised a gel material of silicon. The wires 76 were fully covered with the sealing resin 82 by potting, and then the assembly was hardened by the application of ultraviolet radiation and heat curing. Because of purple plague for increasing the contact resistance between the electrode pads 65 (gold) and the wires 76 (aluminum), if the process temperature does not rise to about 150° C., then the sealing resin 82 may be dispensed with. If the resin 82 is reduced for cost reduction, then it should desirably be in an amount to embed the portions of the wires 76 from the feet (pressed regions) of the wires 76 to about ⅓ of the height of the wires 76.

Figure 12:
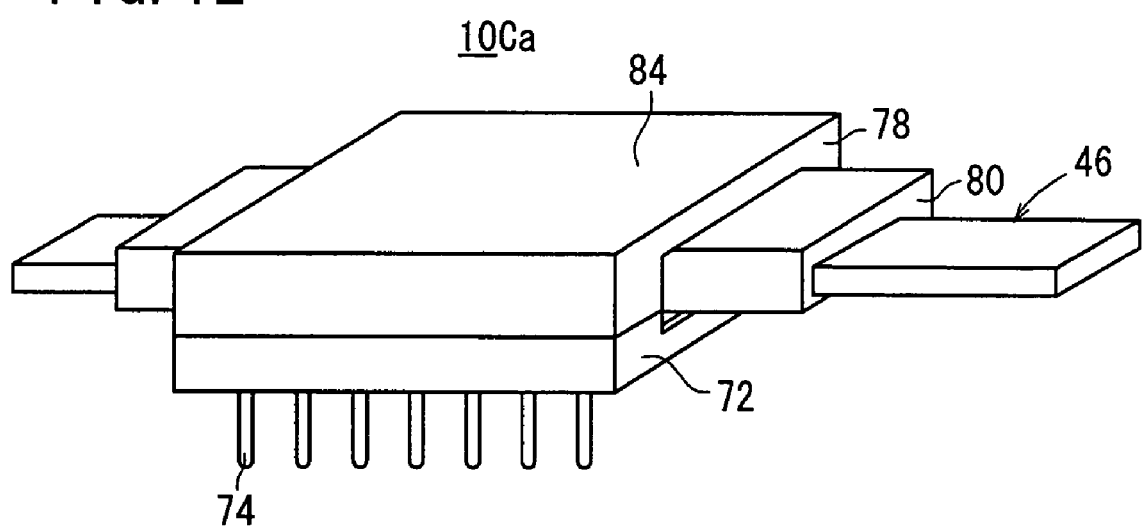
FIG. 12 is a perspective view of a completed optical device wherein a lid is fixed to an opening in the upper surface of the ring.

Then, as shown in FIG. 12, a lid 84 was placed and fixed over the opening in the upper surface of the ring 78. The lid 84 comprised a plate of stainless steel. The lid 84 may be of a resin mold for cost reduction. The lid 84 was fixed by a thermosetting resin, producing a complete product.

The in-line power monitoring module (the optical device 10Ca according to the present inventive example) completed according to the above process was then inspected.

The in-line power monitoring module was inspected for various items of transmission-side characteristics and division-side characteristics. For the transmission-side characteristics, an insertion loss, a polarization dependency loss, and a wavelength dependency were measured in each channel. As a result, levels that cause no problems in use, i.e., the insertion loss<0.8 dB, the polarization dependency loss<0.05 dB, and the wavelength dependency<0.1 dB, were obtained.

For the division-side characteristics, a PD efficiency, a polarization dependency of the PD efficiency, a wavelength dependency, and inter-channel crosstalk on the PD array were measured in each channel. As a result, levels that cause no problems in use, i.e., the PD efficiency in the range from 50 to 70 mA/W, the polarization dependency of the PD efficiency<0.3 dB, and the wavelength dependency<0.5 dB were obtained. The crosstalk was inspected as total crosstalk. Specifically, while either one of the 12 channels was being energized, a sum of currents flowing through the other channels was determined, and the ratio of the current flowing through the input channel and the sum of the currents flowing through the other channels was expressed in terms of 10 log. As a result, the crosstalk in either one of the channels was −34 dB or lower, confirming that the in-line power monitoring module exhibited excellent characteristics.

The optical device according to the present invention is not limited to the above embodiments, but may have various arrangements without departing from the scope of the invention.

What is claimed is:

1. An optical device comprising:
  a first substrate with V-shaped grooves defined therein;
  one or more optical fibers fixed in the V-shaped grooves in said first substrate, said optical fibers having a reflecting function;
  an optical element fixed by an adhesive layer to an optical path of reflected light which is generated by at least said reflecting function, outside of claddings of said optical fibers, wherein said adhesive layer is on said optical path of reflected light;
  an anti-reflection film formed on at least one of upper and lower surfaces of said optical element; and
  a second substrate having a principal surface on which said optical element is mounted;
  wherein of a gap between said principal surface of said second substrate and said optical element, a gap between at least an active layer of said optical element and said principal surface of said second substrate has no light reflecting member disposed therein.

2. An optical device according to claim 1, wherein a refractive index of said gap between said active layer of said optical element and said principal surface of said second substrate is lower than a refractive index of a surface of said optical element.

3. An optical device comprising:
a first substrate with V-shaped grooves defined therein;
one or more optical fibers fixed in said first substrate, said optical fibers having a reflecting function;
an optical element fixed by an adhesive layer to an optical path of reflected light which is generated by at least said reflecting function, outside of claddings of said optical fibers, wherein said adhesive layer is on said optical path of reflected light; and
a second substrate having a principal surface on which said optical element is mounted;
wherein of a gap between said principal surface of said second substrate and said optical element, a gap between at least an active layer of said optical element and said principal surface of said second substrate has no light reflecting member disposed therein and is filled with an anisotropic conductive material.

4. An optical device according to claim 3, wherein of said gap between said principal surface of said second substrate and said optical element, a portion except said gap between at least said active layer of said optical element and said principal surface of said second substrate has an electrode layer interposed therein.

5. An optical device according to claim 1, wherein said gap between at least said active layer of said optical element and said principal surface of said second substrate is 20 µm.

6. An optical device according to claim 1, wherein said reflected light is applied to said optical element at an angle of 10° or greater with respect to a vertical direction.

* * * * *

UNITED STATES PATENT AND TRADEMARK OFFICE
CERTIFICATE OF CORRECTION

| | | |
|---|---|---|
| PATENT NO. | : 7,195,402 B2 | |
| APPLICATION NO. | : 11/156298 | |
| DATED | : March 27, 2007 | |
| INVENTOR(S) | : Masashi Fukuyama, Yasunori Iwasaki and Akiyoshi Ide | |

It is certified that error appears in the above-identified patent and that said Letters Patent is hereby corrected as shown below:

Title Page

*Item (56) References Cited- Foreign Patent Documents*:

please change "JP 2001-10684   4/2001" to --JP 2001-102684   4/2001--

Signed and Sealed this

Eighth Day of May, 2007

JON W. DUDAS
*Director of the United States Patent and Trademark Office*